(12) United States Patent
Song et al.

(10) Patent No.: US 12,395,069 B2
(45) Date of Patent: Aug. 19, 2025

(54) POWER SUPPLY SYSTEM, SOFT-START CIRCUIT, AND CONTROL METHOD

(71) Applicant: HUAWEI TECHNOLOGIES CO., LTD., Guangdong (CN)

(72) Inventors: Weiping Song, Shenzhen (CN); Jinlong Wang, Dongguan (CN); Zhongshu Zhang, Chengdu (CN); Ling Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 18/318,815

(22) Filed: May 17, 2023

(65) Prior Publication Data

US 2023/0291307 A1   Sep. 14, 2023

Related U.S. Application Data

(63) Continuation of application No. PCT/CN2021/103594, filed on Jun. 30, 2021.

(30) Foreign Application Priority Data

Nov. 18, 2020   (CN) .......................... 202011293892.0

(51) Int. Cl.
*H02M 1/36* (2007.01)
*H02M 1/00* (2006.01)
*H02M 1/08* (2006.01)

(52) U.S. Cl.
CPC ........... *H02M 1/36* (2013.01); *H02M 1/0058* (2021.05); *H02M 1/08* (2013.01)

(58) Field of Classification Search
CPC ............ H02M 1/36; H02M 1/32; H02M 1/08; H02M 1/322; H02M 1/34; H02M 3/158;
(Continued)

(56) References Cited

U.S. PATENT DOCUMENTS 9,705,303 B2 *   7/2017   Zhang ................... H02M 7/125

FOREIGN PATENT DOCUMENTS

| CN | 210490824 U | 5/2020 |
|---|---|---|
| CN | 111509963 A | 8/2020 |
| CN | 112564078 A | 3/2021 |

OTHER PUBLICATIONS

International Search Report and Written Opinion issued in PCT Application No. PCT/CN2021/103594 dated Oct. 11, 2021.
(Continued)

*Primary Examiner* — Bryan R Perez

(57) ABSTRACT

This application discloses a power supply system, including: A first end of a bus capacitor is connected to a first end of a power supply, and a second end of the bus capacitor is connected to a second end of a semiconductor switch device. A first end of the semiconductor switch device is connected to a second end of the power supply. An input end of a power conversion circuit is connected to the bus capacitor. Two ends of a resistor are respectively connected to the first end and the second end of the semiconductor switch device. When the semiconductor switch device is switched off, the power supply supplies power to the bus capacitor by using the resistor. When a voltage of the bus capacitor is greater than a first preset voltage, an auxiliary power supply is powered on and the semiconductor switch device is switched off.

17 Claims, 10 Drawing Sheets

(58) Field of Classification Search
CPC ........ H02M 3/155; H02M 3/28; H02M 3/156; H02M 3/3353; H02J 7/02; H02J 7/007; H02J 7/35
See application file for complete search history.

(56) References Cited

OTHER PUBLICATIONS

Chinese Office Action issued in counterpart Chinese Application No. 202011293892.0 dated Nov. 10, 2022.

* cited by examiner

POWER SUPPLY SYSTEM, SOFT-START CIRCUIT, AND CONTROL METHOD

CROSS-REFERENCE TO RELATED APPLICATIONS

This application is a continuation of International Application No. PCT/CN2021/103594, filed on Jun. 30, 2021, which claims priority to Chinese Patent Application No. 202011293892.0, filed on Nov. 18, 2020. The disclosures of the aforementioned applications are hereby incorporated by reference in their entireties.

TECHNICAL FIELD

This application relates to the field of power supply technologies, and in particular, to a power supply system, a soft-start circuit, and a control method.

BACKGROUND

At present, a power supply module or a board in a power supply system is hot swappable. Because a transient current surge exists during hot swapping, a soft-start circuit is usually provided. With the soft-start circuit, the power supply module or the board is not subject to a large current surge during the hot swapping.

However, the soft-start circuit provided in the conventional technology is usually implemented by using a relay. A size of the relay is usually large, which affects a size of the entire soft-start circuit. Moreover, higher power indicates a larger size of the relay. In addition, the relay is also relatively high. For a 1 U power supply, the relatively high relay may affect heat dissipation of the power supply.

SUMMARY

To resolve the foregoing technical problem, this application provides a power supply system, a soft-start circuit, and a control method, to implement a soft-start function and reduce an occupied size.

An embodiment of this application provides a power supply system, including an auxiliary power supply, configured to supply power to a controller. A first end of a bus capacitor is connected to a first end of a power supply. A second end of the bus capacitor is connected to a second end of a semiconductor switch device. A first end of the semiconductor switch device is connected to a second end of the power supply. A first input end of a power conversion circuit is connected to the first end of the bus capacitor. A second input end of the power conversion circuit is connected to the second end of the bus capacitor. The power conversion circuit may be a rectifier circuit or an inverter circuit. This is not specifically limited in this embodiment of this application. Two ends of a resistor are respectively connected to the first end and the second end of the semiconductor switch device. When the semiconductor switch device is switched off, the power supply supplies power to the bus capacitor by using the resistor. In other words, by using a current limiting function of the resistor, a large current pulse caused at a power-on moment of the power supply can be suppressed, and a surge on the bus capacitor can be reduced. When a voltage of the bus capacitor is greater than a first preset voltage, the auxiliary power supply is powered on and the semiconductor switch device is switched off. When the voltage of the bus capacitor is greater than a second preset voltage, that is, the voltage of the bus capacitor already reaches a specific degree, a voltage difference between the bus capacitor and the power supply is reduced. When the semiconductor switch device is switched on, a current surge is reduced. Therefore, the controller controls the semiconductor switch device to be switched on. After the semiconductor switch device is switched on, the resistor is bypassed, and the power supply supplies power to the bus capacitor by using the semiconductor switch device. The second preset voltage is greater than the first preset voltage. A type of the semiconductor device is not specifically limited in this embodiment of this application. For example, a metal-oxide-semiconductor field-effect transistor MOS may be selected.

To reduce a volume of a soft-start circuit of a power supply module or a board, this embodiment of this application provides a soft-start circuit that includes a semiconductor switch device instead of a relay. A size of the semiconductor switch device is smaller. In addition, in this embodiment of this application, the semiconductor switch device can be accurately controlled to be switched on. This may effectively control operating time of the semiconductor switch device in a linear region, so that the semiconductor switch device crosses the linear region as soon as possible, reducing switch-on power consumption in the linear region. In addition, if switch-on time in the linear region is shorter, the semiconductor switch device with a smaller volume may be selected, further reducing the volume of the entire soft-start circuit.

In a possible implementation, the power supply system further includes a drive module. A first end of the drive module is connected to a controller, and a second end of the drive module is connected to a control end of the semiconductor switch device. When the auxiliary power supply is powered on, the auxiliary power supply is configured to supply power to the drive module, so that the drive module drives the semiconductor switch device to be switched off. The drive module may be built by using an analog circuit, or may be an integrated chip. This is not specifically limited in this embodiment of this application.

In a possible implementation, when the voltage of the bus capacitor is greater than the second preset voltage, the controller sends a first drive signal to the drive module. The drive module is configured to control, based on the first drive signal, the semiconductor switch device to be switched on. For example, the first drive signal may be a high-level signal.

In a possible implementation, the power supply system further includes an isolator. The isolator is connected between the controller and the drive module. In a possible implementation, the isolator is an optical coupler. The controller is specifically configured to: control the optical coupler to be switched on when the voltage of the bus capacitor is greater than the second preset voltage; otherwise, control the optical coupler to be switched off. The optical coupler may isolate an electrical signal, so that an interference signal on an input side of the optical coupler is not transferred to an output side of the optical coupler. This avoids interference to a next-stage circuit.

In a possible implementation, the controller is further configured to control the power conversion circuit to be switched on after the semiconductor switch device is switched on. The power conversion circuit is controlled to be switched on only after soft start, so that the power conversion circuit can be protected from a surge of a peak current.

In a possible implementation, the controller is further configured to control the power conversion circuit to be switched off when the voltage of the power supply is less than a third preset voltage. When the power supply is powered off, to protect the power conversion circuit, the power conversion circuit needs to be first switched off and stops operating.

In a possible implementation, the controller is further configured to send a second drive signal to the drive module when the voltage of the power supply or the bus voltage is less than a fourth preset voltage. The drive module controls, based on the second drive signal, the semiconductor switch device to be switched off. The fourth preset voltage is less than the third preset voltage. The second drive signal may be a low-level signal.

In a possible implementation, when the voltage of the power supply or the bus voltage is less than a fifth preset voltage, the auxiliary power supply is powered off. The fifth preset voltage is less than the fourth preset voltage.

In a possible implementation, the semiconductor switch device includes any one of the following: a field-effect transistor, a transistor, and a triode.

An embodiment of this application further provides a soft-start circuit, including a semiconductor switch device, a resistor, an auxiliary power supply, and a controller. The auxiliary power supply is configured to supply power to the controller. A second end of the semiconductor switch device is connected to a second end of a bus capacitor. A first end of the semiconductor switch device is connected to a second end of a power supply. A first end of the bus capacitor is connected to a first end of the power supply. Two ends of the resistor are separately connected to the first end and the second end of the semiconductor switch device. When the semiconductor switch device is switched off, the power supply supplies power to the bus capacitor by using the resistor. When a voltage of the bus capacitor is greater than a first preset voltage, the auxiliary power supply is powered on and the semiconductor switch device is switched off. When the voltage of the bus capacitor is greater than a second preset voltage, the controller is configured to control the semiconductor switch device to be switched on, where the second preset voltage is greater than the first preset voltage. After the semiconductor switch device is switched on, the power supply supplies power to the bus capacitor by using the semiconductor switch device.

In a possible implementation, the soft-start circuit further includes a drive module. A first end of the drive module is connected to the controller, and a second end of the drive module is connected to a control end of the semiconductor switch device. When the auxiliary power supply is powered on, the auxiliary power supply supplies power to the drive module, so that the drive module drives the semiconductor switch device to be switched off.

In a possible implementation, the controller is specifically configured to send a first drive signal to the drive module when the voltage of the bus capacitor is greater than the second preset voltage. The drive module is configured to control, based on the first drive signal, the semiconductor switch device to be switched on.

In a possible implementation, the soft-start circuit further includes an optical coupler connected between the controller and the drive module. The controller is specifically configured to: control the optical coupler to be switched on when the voltage of the bus capacitor is greater than the second preset voltage; otherwise, control the optical coupler to be switched off.

In a possible implementation, the controller is further configured to send a second drive signal to the drive module when the voltage of the power supply or the voltage of the bus capacitor is less than a fourth preset voltage. The drive module controls, based on the second drive signal, the semiconductor switch device to be switched off.

An embodiment of this application further provides a control method of a soft-start circuit. The soft-start circuit includes a semiconductor switch device, a resistor, and a controller. A second end of the semiconductor switch device is connected to a second end of a bus capacitor. A first end of the semiconductor switch device is connected to a second end of a power supply. A first end of the bus capacitor is connected to a first end of the power supply. Two ends of the resistor are separately connected to the first end and the second end of the semiconductor switch device. When the semiconductor switch device is switched off, the power supply supplies power to the bus capacitor by using the resistor. The method includes: powering on an auxiliary power supply, and switching off the semiconductor switch device when a voltage of the bus capacitor is greater than a first preset voltage; and controlling the semiconductor switch device to be switched on when the voltage of the bus capacitor is greater than a second preset voltage, where the second preset voltage is greater than the first preset voltage. After the semiconductor switch device is switched on, the power supply supplies power to the bus capacitor by using the semiconductor switch device.

In a possible implementation, the soft-start circuit further includes a drive module. The controlling the semiconductor switch device to be switched on when the voltage of the bus capacitor is greater than a second preset voltage specifically includes: sending a first drive signal to the drive module when the voltage of the bus capacitor is greater than the second preset voltage, so that the drive module controls, based on the first drive signal, the semiconductor switch device to be switched on.

In a possible implementation, the soft-start circuit further includes: sending a second drive signal to the drive module when the voltage of the power supply or the voltage of the bus capacitor is less than a fourth preset voltage. The drive module controls, based on the second drive signal, the semiconductor switch device to be switched off.

Compared with the conventional technology, the technical solutions provided in embodiments of this application have the following advantages:

The soft-start circuit in the power supply system provided in embodiments of this application includes the semiconductor switch device. Soft start is implemented by using the semiconductor switch device instead of the relay. Since the volume of the semiconductor switch device is smaller than that of the relay, the volume of the entire soft-start circuit can be reduced, and the volumes of the power supply module and the board can be further reduced. In addition, according to the technical solutions provided in embodiments of this application, the controller controls the semiconductor switch device to be switched on when the voltage of the bus capacitor is greater than the second preset voltage. That is, the controller accurately controls switch-on time of the semiconductor switch device, so that the semiconductor switch device crosses the linear region as soon as possible and enters a switch-on state, reducing a loss of the semiconductor switch device in the linear region. Furthermore, for example, the semiconductor switch device uses a MOS transistor. Shorter stay time in the linear region indicates easier selection of the MOS transistor. A transistor with a smaller SOA may be selected. The smaller SOA corresponds to a smaller size and a lower Rdson of the MOS transistor, further reducing a switch-on loss and improving efficiency of the power supply. The technical solutions provided in embodiments may reduce the circuit size and a volume of the entire power supply system based on soft-start implementation.

DESCRIPTION OF EMBODIMENTS

The following terms "first", "second", and the like are only intended for a purpose of description, and shall not be understood as an indication or implication of relative importance or implicit indication of a quantity of indicated technical characteristics. Therefore, a feature limited by "first" or "second" may explicitly or implicitly include one or more features. In the description of this application, unless otherwise stated, "a plurality of" means two or more than two.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, unless otherwise specified and limited, the term "connection" should be understood in a broad sense. For example, the "connection" may be a fixed connection, a detachable connection, an integration, a direct connection, or an indirect connection by using an intermediate medium. In addition, the term "coupling" may be a manner of implementing an electrical connection for signal transmission. The "coupling" may be a direct electrical connection, or may be an indirect electrical connection through an intermediate medium.

In a power supply system, for a hot-swappable power supply module and a board, for example, a power supply module and a board that are inside a cabinet supplying power to AI or a data center and that are mostly designed to be hot swappable, a current surge exists at a moment at which power is on. Therefore, a soft-start circuit needs to be designed for the hot-swappable power supply module or the board.

For example, an input voltage of the board usually ranges from −36 V to −72 V, and an output voltage is usually 53.5 V direct current, 12 V direct current, or less. Currently, most modular boards and some direct current power supplies on a network use −48 V.

Figure 1A:
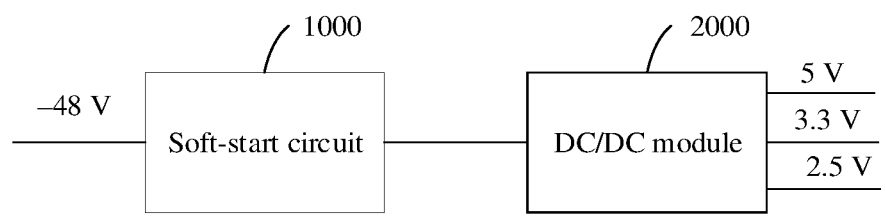
FIG. 1A is a schematic diagram of a board.

FIG. 1A is a schematic diagram of a board.

The board uses a direct current/direct current DC/DC module 2000 to convert a −48 V power supply into 5 V, 3.3 V, 2.5 V power supplies, and the like. To reduce a current surge when the board is inserted and powered on, a soft-start circuit 1000 is connected before the DC/DC module 2000.

A voltage difference between an input voltage and an output voltage is large, and the circuit has a large capacitor for filtering and preventing transient power-off. Therefore, charging and discharging occur. When the board or the power supply module is inserted and powered on, the −48 V power supply is affected. A transient high current causes a voltage drop of the −48 V power supply, which may affect normal operation of another board. In addition, due to the transient high current, an obvious spark occurs on a connector when the board is inserted. As a result, electromagnetic interference occurs and the connector is corroded. Therefore, to solve the foregoing technical problem, the board needs to control a power-on rate of the −48 V power supply. That is, the soft-start circuit 1000 needs to be added. During hot swapping, the soft-start circuit 1000 may enable the power supply to be powered on slowly, to reduce the current surge on the DC/DC module 2000.

Figure 1B:
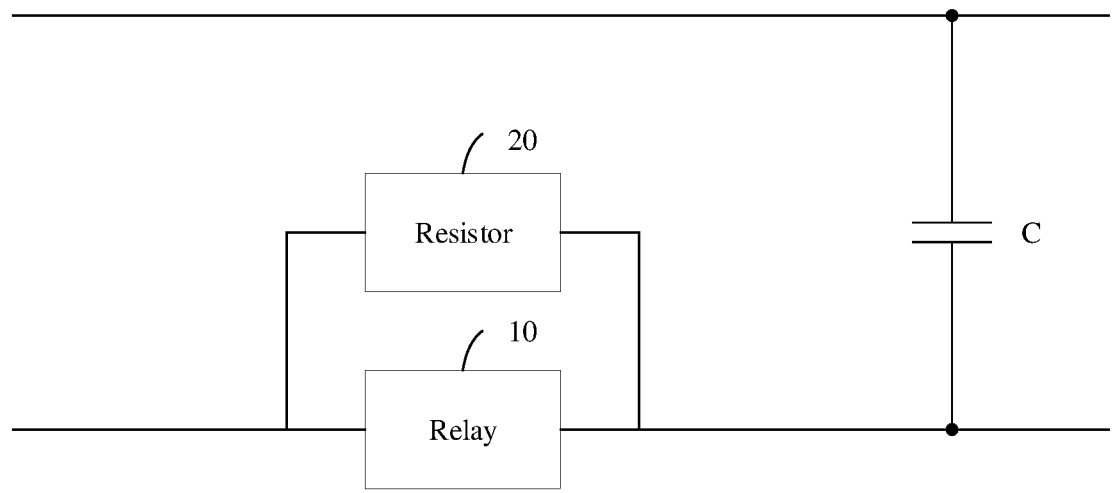
FIG. 1B is a schematic diagram of implementing a soft-start circuit by using a relay.

FIG. 1B is a schematic diagram of implementing the soft-start circuit by using a relay.

The soft-start circuit includes a relay 10 and a resistor 20.

A bus capacitor C is connected in parallel to an output end of the soft-start circuit.

The relay 10 is connected in series in a power supply path, and the resistor 20 and the relay 10 are connected in parallel.

When an input end is connected to the power supply, the relay 10 is switched off, and the power supply supplies power to a next-stage circuit by using the resistor 20. Because a resistance value of the resistor 20 is usually large, a magnitude of an impulse current may be limited, to prevent a large current surge caused to the next-stage circuit when the power supply is powered on.

When a voltage of the bus capacitor C reaches a specific degree, the relay 10 is switched on, and the power supply supplies power to the next-stage circuit by using the switched-on relay 10. In this way, a soft-start process is completed.

The soft-start circuit described in FIG. 1B includes the relay, and soft start is implemented by using the relay and the resistor. However, the relay is too large and high, which affects a volume of the power supply module or the board.

Therefore, to reduce a volume of the soft-start circuit of the power supply module or the board, embodiments of this application provide the soft-start circuit that includes a semiconductor switch device instead of the relay. A size of the semiconductor switch device is smaller. In addition, in embodiments of this application, the semiconductor switch device can be accurately controlled to be switched on. This may effectively control operating time of the semiconductor switch device in a linear region, so that the semiconductor switch device crosses the linear region as soon as possible, reducing switch-on power consumption in the linear region. In addition, if switch-on time in the linear region is shorter, the semiconductor switch device with a smaller volume may be selected, further reducing the volume of the entire soft-start circuit.

It should be noted that the relay is not a semiconductor switch device.

A type of the semiconductor power device is not specifically limited in embodiments of this application. For example, the type may be any one of the following:

a field-effect transistor, a transistor, and a triode.

The field-effect transistor is a metal-oxide semiconductor field-effect transistor (MOSFET, Metal-Oxide-Semiconductor Field-Effect Transistor), which is a MOS transistor for short. The MOS transistor includes a PMOS and an NMOS.

To enable a person skilled in the art to better understand the technical solutions provided in embodiments of this application, the following embodiments are described by using the MOS transistor as an example.

According to the power supply system provided in embodiments of this application, a controller accurately controls a switch-on state of the MOS transistor. If switch-off and switch-on of the MOS transistor are not controlled, but automatic switch-on is implemented based on a value of a gate-source voltage, the MOS transistor easily enters a safe operating area (SOA, Safe Operating Area). The SOA is a linear region. A large SOA capability of the MOS transistor is required when the MOS transistor works in the linear region for a long period of time. However, a larger SOA capability of the MOS transistor indicates a corresponding higher switch-on resistance Rdson of the MOS transistor. Usually, for a MOS transistor with better SOA performance, the Rdson is doubled. A higher Rdson value indicates higher power consumption of the MOS transistor.

According to the power supply system provided in embodiments of this application, the controller accurately controls the MOS transistor to be switched on, so that the MOS transistor crosses the linear region as soon as possible. This shortens operating time of the MOS transistor in the linear region. In this way, a MOS transistor with a smaller SOA may be selected, and the corresponding Rdson of the MOS transistor is also relatively low, reducing a switch-on loss of the MOS transistor. In addition, the MOS transistor with the smaller SOA has a smaller package size.

In embodiments of this application, the controller accurately controls switch-on time of the MOS transistor, to further control time of the MOS transistor in the linear region, so that the MOS transistor crosses the linear region as soon as possible. Further, the MOS transistor with the smaller SOA may be selected, and the MOS transistor with the relatively low Rdson may be selected, reducing a loss of the soft-start circuit. This can reduce a size of the MOS transistor, a size of a circuit board, the volume of the entire soft-start circuit, and a volume of the power supply system.

Embodiment 1 of a power supply system:

To enable a person skilled in the art to better understand the technical solution provided in this embodiment of this application, the following describes an operating principle of the technical solution in detail with reference to the accompanying drawing.

Figure 2:
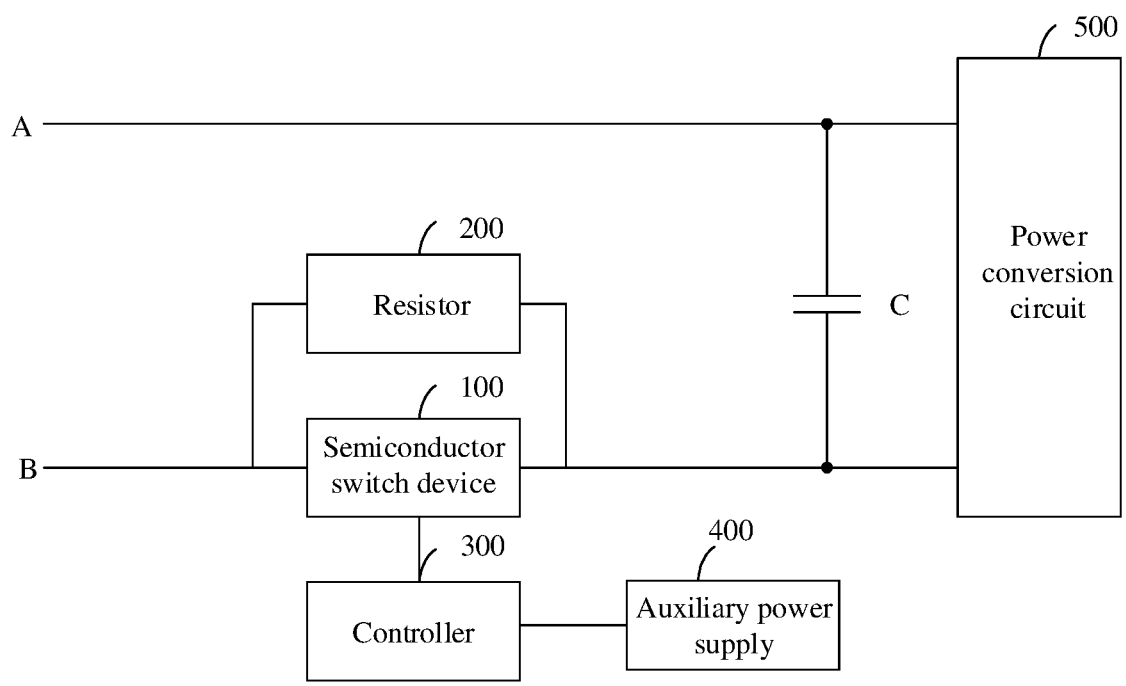
FIG. 2 is a schematic diagram of a power supply system according to an embodiment of this application.

FIG. 2 is a schematic diagram of a power supply system according to an embodiment of this application.

The power supply system provided in this embodiment includes a soft-start circuit. The soft-start circuit includes a semiconductor switch device instead of a relay.

The power supply system provided in this embodiment includes a semiconductor switch device 100, a resistor 200, a controller 300, a bus capacitor C, an auxiliary power supply 400, and a power conversion circuit 500. The auxiliary power supply 400 is configured to supply power to the controller.

A first end of the bus capacitor C is connected to a first end of a power supply, and a second end of the bus capacitor C is connected to a second end of the semiconductor switch device 100. A first end of the semiconductor switch device 100 is connected to a second end of the power supply.

A size of the bus capacitor C is not specifically limited in this embodiment of this application, and the bus capacitor C may be selected based on a voltage level of the power supply. The bus capacitor may be one capacitor, or may be implemented by connecting a plurality of capacitors in series. This is not specifically limited.

As shown in FIG. 2, the first end of the power supply is A, and the second end of the power supply is B. Usually, a voltage of the end A is higher than a voltage of the end B. In this embodiment of this application, the voltage level of the power supply is not specifically limited, and a positive voltage or a negative voltage of the power supply is not limited. For example, the voltage may be a positive voltage, or may be a negative voltage. For example, when the power supply is a negative voltage power supply, the voltage of the end A is 0 V, and the voltage of the end B is −48 V.

A first input end of the power conversion circuit 500 is connected to the first end of the bus capacitor C, and a second input end of the power conversion circuit 500 is connected to the second end of the bus capacitor C.

The power conversion circuit may be controlled by the controller. In other words, the power conversion circuit and the soft-start circuit share the same controller. In addition, the power conversion circuit may also be controlled by another processor. In other words, the power conversion circuit and the soft-start circuit may be separately controlled by different controllers.

In this embodiment of this application, a specific implementation form of the power conversion circuit is not limited. For example, the power conversion circuit may be a direct current/direct current conversion circuit, namely, a DC/DC conversion circuit. Alternatively, the power conversion circuit may be a direct current/alternating current conversion circuit, namely, a DC/AC conversion circuit.

Two ends of the resistor 200 are separately connected to the first end and the second end of the semiconductor switch device 100. When the semiconductor switch device is switched off, the power supply supplies power to the bus capacitor C by using the resistor 200.

In this embodiment of this application, a specific form of the resistor 200 is not specifically limited, and a resistance value of the resistor 200 is not specifically limited. A specific resistance value may be selected based on a magnitude of a power supply voltage. For example, in a possible implementation form, the resistor 200 may be a cement resistor.

When a voltage of the bus capacitor C is greater than a first preset voltage, the auxiliary power supply 400 is powered on and the semiconductor switch device is switched off.

When the voltage of the bus capacitor C is greater than a second preset voltage, the controller 300 controls the semiconductor switch device 100 to be switched on. The second preset voltage is greater than the first preset voltage. After the semiconductor switch device 100 is switched on, the power supply supplies power to the bus capacitor C by using the semiconductor switch device 100.

The second preset voltage may be selected based on a connection voltage level between the end A and the end B. For example, when the voltage of the end B is −48 V, the second preset voltage may be 30 V. That is, when the voltage of the bus capacitor C is greater than 30 V, the controller 300 controls the semiconductor switch device 100 to be switched on.

It may be understood that the semiconductor switch device 100 is a three-end device, and an on/off state of the semiconductor switch device 100 may be changed by changing a drive signal of a control end of the semiconductor switch device 100. For example, for a MOS transistor, a gate electrode is the control end of the MOS transistor, and the controller 300 may control the MOS transistor by sending the drive signal to the gate electrode of the MOS transistor. During specific implementation, the controller 300 changes the drive signal of the semiconductor switch device 100, so that the semiconductor switch device crosses a linear region as soon as possible and enters a switch-on state.

Specifically, the controller 300 may control a capacitor between gate sources of the MOS transistor to be quickly charged, so that the MOS transistor is saturated and switched on. Compared with an uncontrolled MOS transistor, in the technical solution provided in this embodiment of this application, a capacitor with a smaller capacitance value may be selected as the capacitor between the gate sources of the MOS transistor, so that the MOS transistor may quickly cross the linear region. However, a capacitance value of a capacitor between gate sources of the uncontrolled MOS transistor is usually relatively large. In this case, during fast power-on and power-off, the MOS transistor may be in the linear region for a long period of time, and the MOS transistor is not damaged only when a SOA capability of the MOS transistor is large.

It should be noted that before the power supply is not powered on, the semiconductor switch device 100 is switched off by default. When the power supply is not inserted, in other words, when the end A and the end B are not connected to a previous-stage power supply, the voltage of the bus capacitor C is relatively low, and is less than or equal to the second preset voltage. Therefore, the semiconductor switch device 100 is switched off by default. For example, the semiconductor switch device is a MOS transistor, and a gate-source voltage of the MOS transistor is pulled down. In other words, the MOS transistor is switched off.

When the MOS transistor is switched off, the power supply connected to the end A and the end B charges the bus capacitor C by using the resistor 200. A resistance value of the resistor 200 is larger than that of the MOS transistor. Therefore, a size of a charging current of the bus capacitor C may be limited. This can prevent a transient large current surge when the power supply is connected, control the power-on rate, and implement soft start of the circuit.

The controller 300 controls the semiconductor switch device 100 to be switched on only when the voltage of the bus capacitor C is greater than the second preset voltage. This indicates that the voltage of the bus capacitor C is large enough. In this case, switching on the semiconductor switch device 100 does not cause a large current surge on a next-stage circuit, implementing soft start of the power supply. When the semiconductor switch device 100 is switched on, the resistor 200 is equivalent to being bypassed. In other words, the power supply at the end B supplies power to the next-stage circuit by using the semiconductor switch device 100.

The soft-start circuit in the power supply system provided in this embodiment includes the semiconductor switch device instead of the relay. Since a volume of the semiconductor switch device is smaller than that of the relay, a volume of the entire soft-start circuit can be reduced, and volumes of a power supply module and a board can be reduced. In addition, according to the technical solution provided in this embodiment of this application, the controller accurately controls switch-on time of the semiconductor switch device, so that the semiconductor switch device crosses the linear region as soon as possible and enters a switch-on state, reducing a loss of the semiconductor switch device in the linear region. Furthermore, shorter stay time in the linear region indicates easier selection of the MOS transistor. A transistor with a smaller SOA may be selected. The smaller SOA corresponds to a smaller size and a lower Rdson of the MOS transistor, further reducing a switch-on loss. The technical solution provided in this embodiment may reduce a circuit size and a volume of the entire power supply system based on soft-start implementation. The technical solution is applicable to a 1 U power supply, and does not affect heat dissipation.

Figure 3:
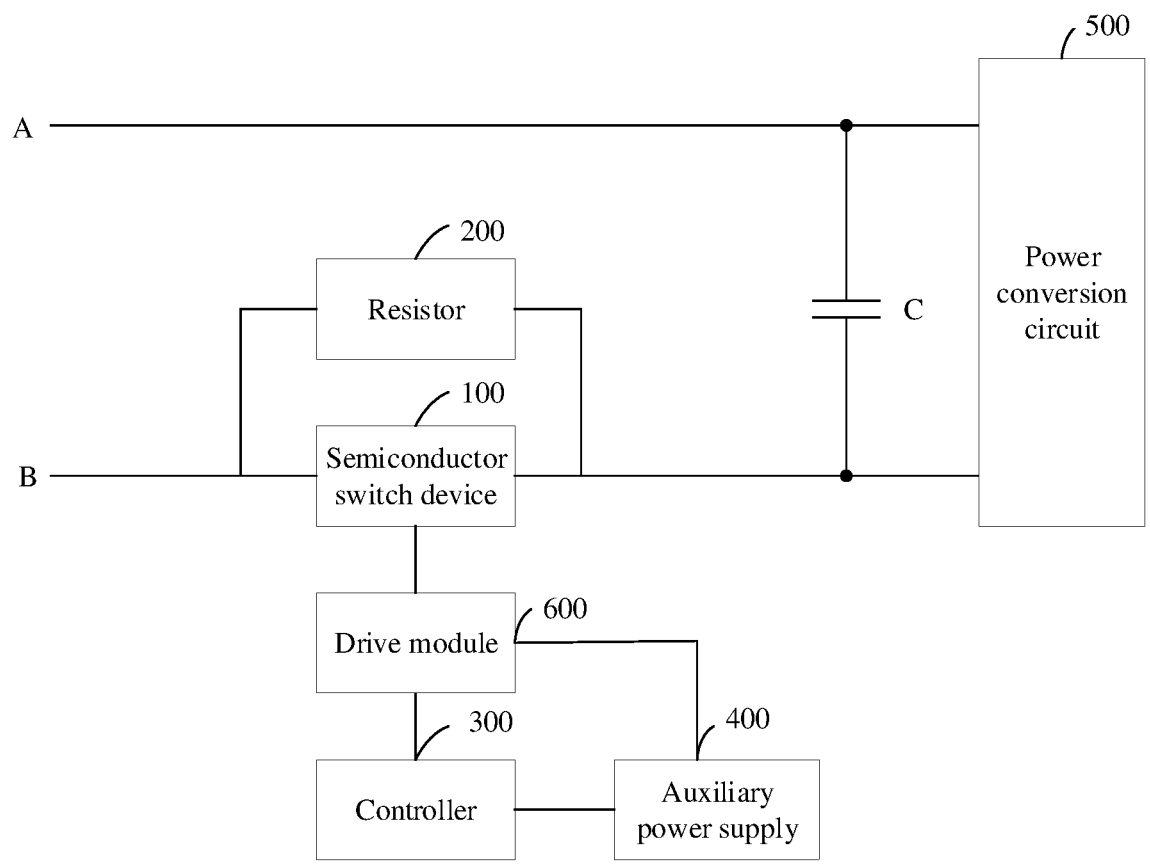
FIG. 3 is a schematic diagram of another power supply system according to an embodiment of this application.

Embodiment 2 of a power supply system:

FIG. 3 is a schematic diagram of another power supply system according to an embodiment of this application.

A difference between the power supply system provided in this embodiment and the power supply system provided in FIG. 2 is that a drive module 600 is added.

A first end of the drive module 600 is connected to a controller 300, and is configured to receive a drive signal sent by the controller 300. A second end of the drive module 600 is connected to a control end of a semiconductor switch device 100. A power supply end of the drive module 600 is connected to an auxiliary power supply 400.

The auxiliary power supply 400 is configured to supply power to the controller 300 and the drive module 600. For example, when an end B is connected to −48 V, a voltage provided by the auxiliary power supply 400 to the controller 300 may be 3 V, and a voltage provided by the auxiliary power supply 400 to the drive module 600 may be 12 V.

When a voltage of a bus capacitor C is greater than a first preset voltage, the auxiliary power supply 400 is powered on. In this case, the semiconductor switch device 100 is switched off by default. A second preset voltage is greater than the first preset voltage. For example, when the end B is connected to −48 V and the second preset voltage is 30 V, the first preset voltage is 23 V. The voltage of the bus capacitor C lags behind an input voltage. Therefore, when the voltage of the bus capacitor C reaches 30 V, the input voltage may have reached 36 V. In a soft-start process, the input voltage between an end A and the end B is greater than the voltage of the bus capacitor C. The foregoing voltage values are only examples for description, and a preset voltage of another value may also be selected.

The controller 300 is specifically configured to send a first drive signal to the drive module 600 when the voltage of the bus capacitor C is greater than the second preset voltage.

The drive module 600 is configured to control, based on the first drive signal, the semiconductor switch device 100 to be switched on.

The following uses an example in which the semiconductor switch device 100 is a MOS transistor for description. The controller 300 sends the first drive signal to the drive module 600. The drive module 600 is controlled by the controller 300 to select to apply the voltage provided by the auxiliary power supply 400 to a gate electrode of the MOS transistor, or select to pull down the gate electrode of the MOS transistor.

For example, the first drive signal is a high-level signal, and the drive module 600 applies the power provided by the auxiliary power supply 400 to the gate electrode of the MOS transistor, so that the MOS transistor is switched on. On the contrary, when the controller 300 does not send the first drive signal to the drive module 600, the drive module 600 does not select to apply the power provided by the auxiliary power supply 400 to the gate electrode of the MOS transistor, and a voltage of the gate electrode of the MOS transistor is pulled down. Therefore, the MOS transistor may remain in a switched-off state and cannot be switched on.

A specific implementation form of the drive module 600 is not specifically limited in this embodiment of this application. For example, a drive circuit formed by using a triode and a peripheral circuit may be used.

Figure 4:
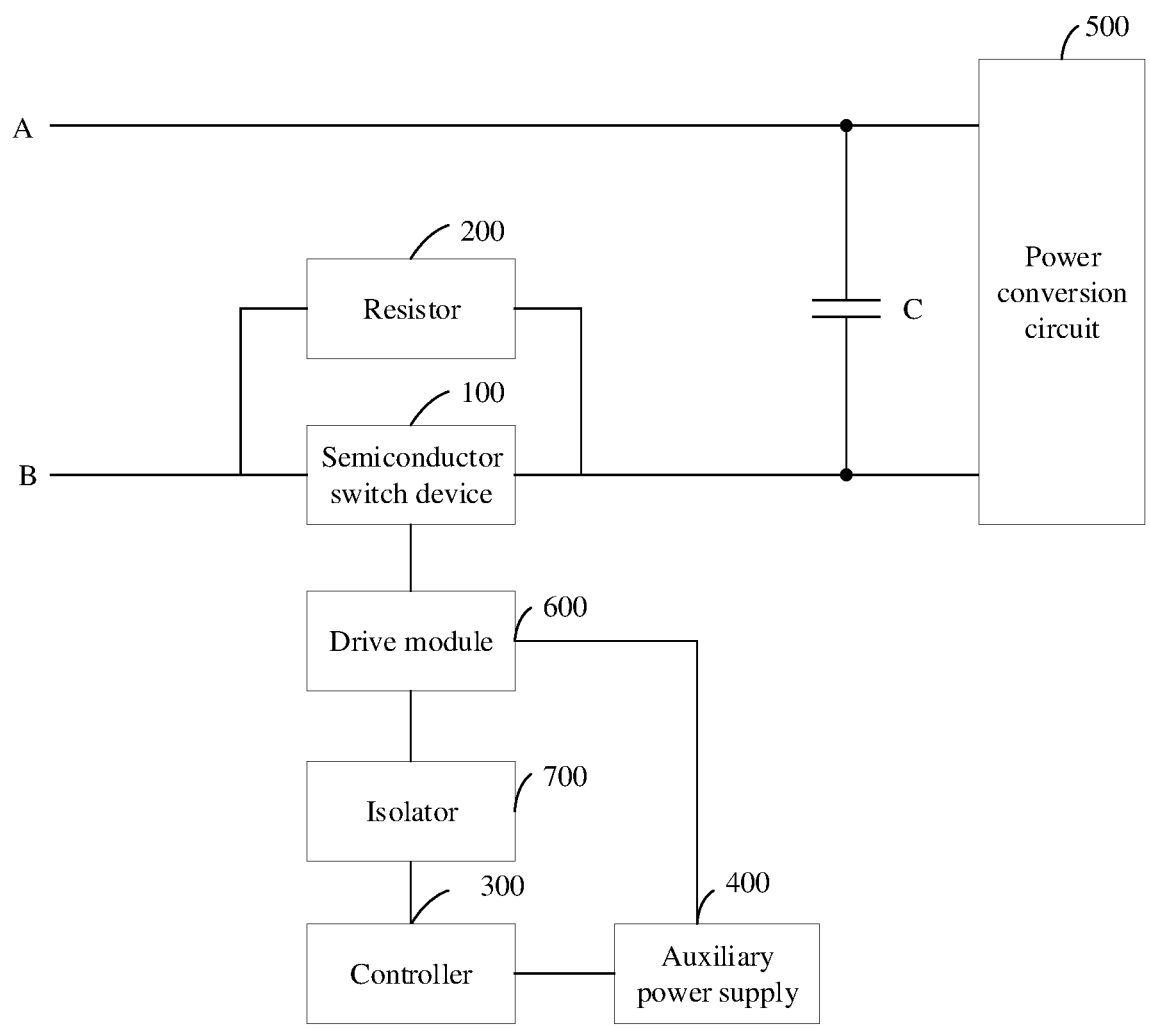
FIG. 4 is a schematic diagram of still another power supply system according to an embodiment of this application.

Embodiment 3 of a power supply system:

FIG. 4 is a schematic diagram of still another power supply system according to an embodiment of this application.

The power supply system provided in this embodiment may further include an isolator 700.

The isolator 700 is connected between a controller 300 and a drive module 600.

Figure 5:
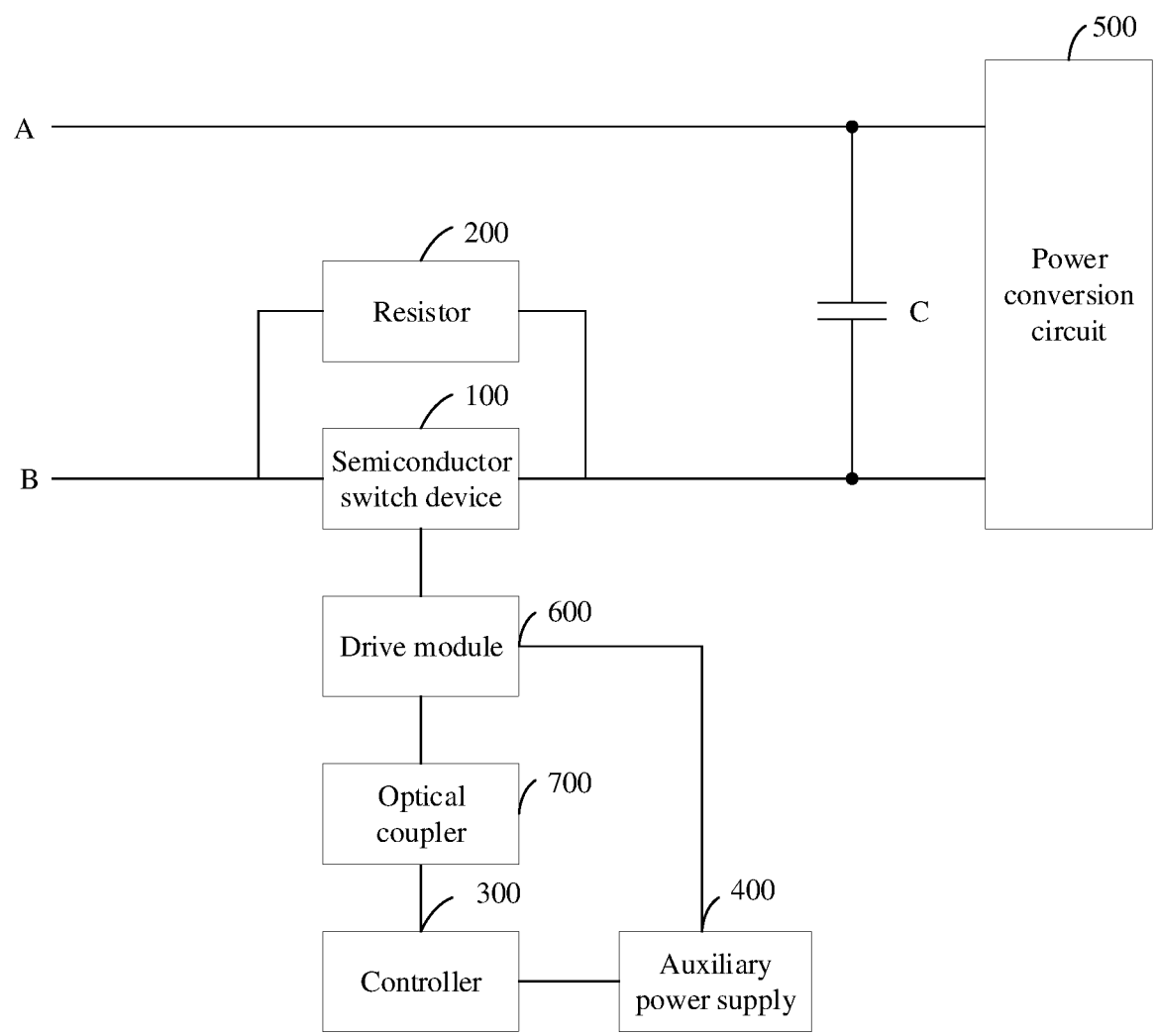
FIG. 5 is a schematic diagram in which an isolator is an optical coupler according to an embodiment of this application.

Specifically, the isolator 700 may be implemented by using an optical coupler, or may be implemented by using another device for electrical signal isolation. As shown in FIG. 5, the isolator is an optical coupler 700.

The following uses an example in which the isolator 700 is an optical coupler for description. The optical coupler may isolate an electrical signal, so that an interference signal on an input side of the optical coupler is not transferred to an output side of the optical coupler. This avoids interference to a next-stage circuit.

The controller 300 is specifically configured to: control the optical coupler 700 to be switched on when a voltage of a bus capacitor C is greater than a second preset voltage, in other words, when the bus capacitor C is charged to a specific degree, to further control a MOS transistor to be switched on; otherwise, control the optical coupler 700 to be switched off, in other words, the MOS transistor is not switched on. When the optical coupler 700 is switched on, the drive module 600 applies power provided by an auxiliary power supply 400 to a gate electrode of the MOS transistor, so that the MOS transistor is conducted, that is, switched on.

The controller 300 is further configured to control a power conversion circuit 500 to be switched on after a semiconductor switch device 100 is switched on. After the power conversion circuit 500 is switched on, the entire power supply system starts to work normally.

Figure 6:
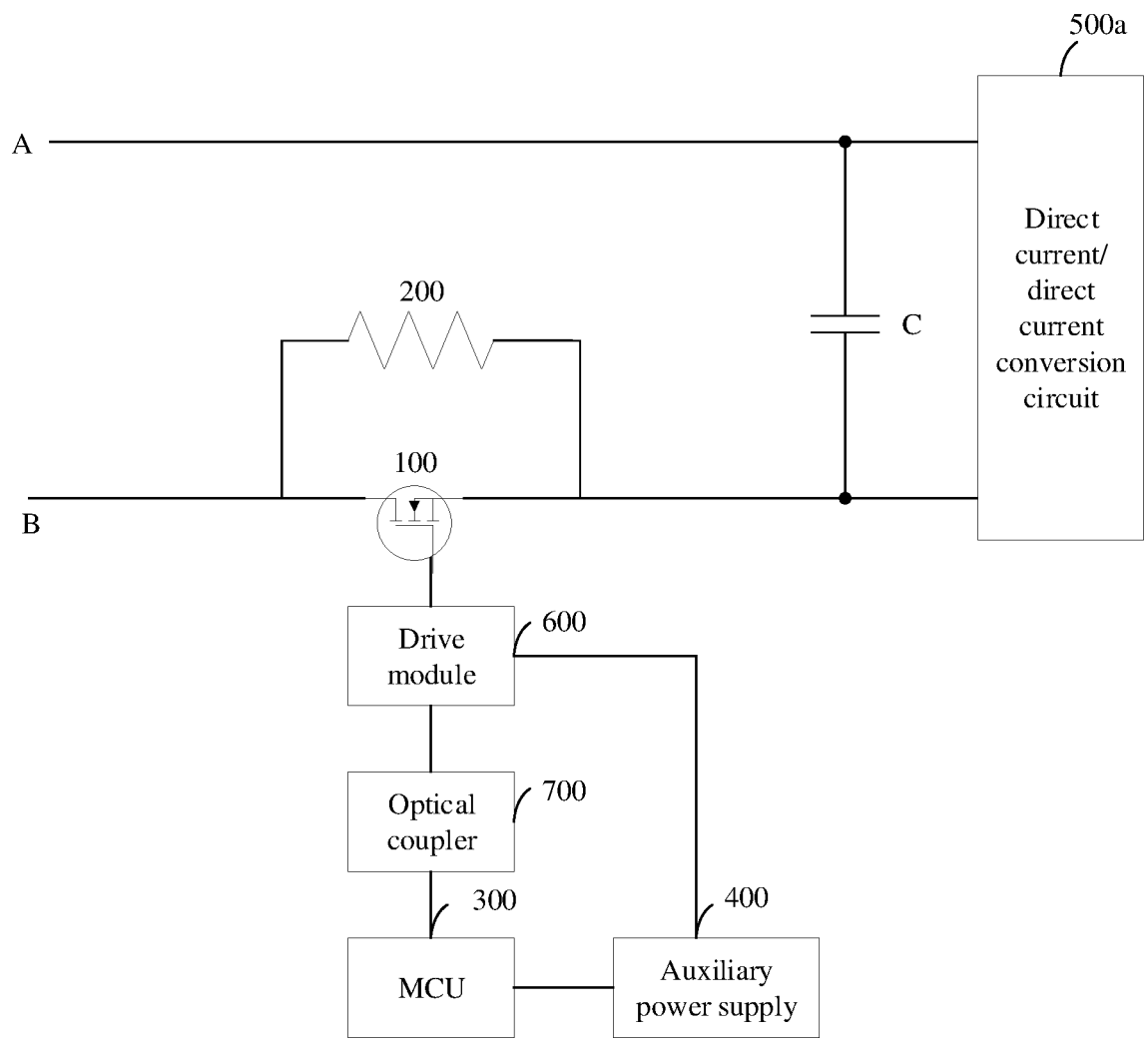
FIG. 6 is a schematic diagram in which a power conversion circuit is a direct current/direct current conversion circuit according to an embodiment of this application.

FIG. 6 is a schematic diagram in which the power conversion circuit is a direct current/direct current conversion circuit according to an embodiment of this application.

FIG. 6 uses an example in which the semiconductor switch device is an NMOS transistor and the power conversion circuit is a direct current/direct current conversion circuit 500a. For example, the direct current/direct current conversion circuit converts an input direct current voltage −48 V into a direct current voltage required by a next-stage circuit, for example, converting the direct current voltage −48 V into a direct current voltage 12 V.

FIG. 6 uses an example in which the controller is an MCU 300 for description. It may be understood that, in addition to the MCU, the controller may be implemented by using another processor, provided that a soft-start circuit can be controlled to work.

Figure 7:
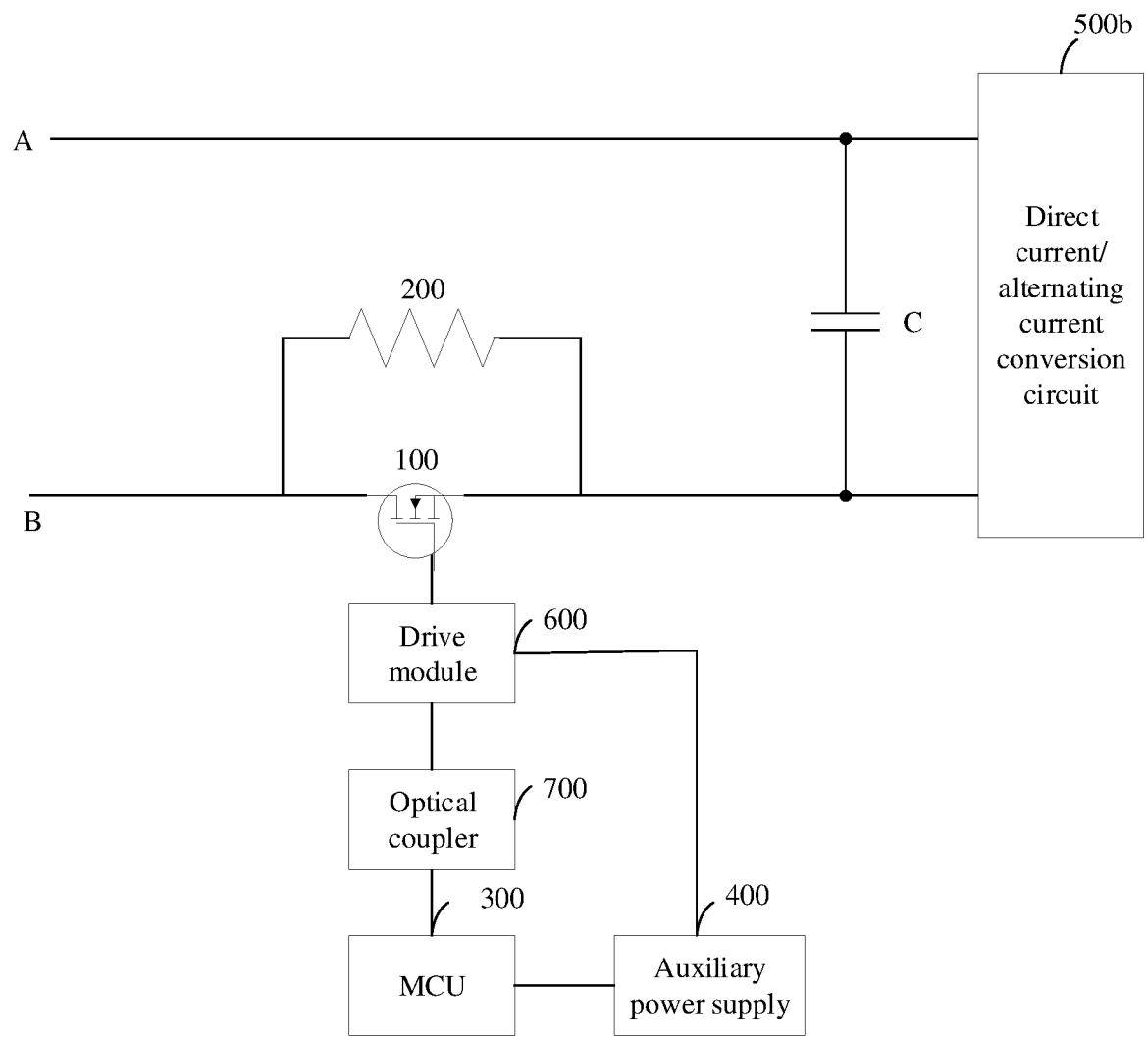
FIG. 7 is a schematic diagram in which a power conversion circuit is a direct current/alternating current conversion circuit according to an embodiment of this application.

FIG. 7 is a schematic diagram in which the power conversion circuit is a direct current/alternating current conversion circuit according to an embodiment of this application.

As shown in FIG. 7, the power conversion circuit may further be a direct current/alternating current conversion circuit 500b. The direct current/alternating current conversion circuit 500b converts a direct current voltage into an alternating current voltage and provides the alternating current voltage to a next-stage circuit.

It should be noted that the foregoing embodiments further include a voltage detection circuit. In other words, a voltage at two ends of the bus capacitor C is detected. In addition, the voltage detection circuit may further detect a voltage of a power supply. The voltage detection circuit sends both the detected voltage of the bus capacitor C and the detected voltage of the power supply to the controller. The controller performs further control based on the voltage sent by the voltage detection circuit. The voltage detection circuit is not shown in the figure. Because a voltage detection circuit technology is relatively mature, details are not described herein again.

It should be noted that the figures in this embodiment of this application are only schematic diagrams. In actual application, a quantity of semiconductor switch devices may be selected based on a power level. For example, when power is relatively high, a plurality of semiconductor switch devices may be selected for connection in parallel. That is, the controller controls the plurality of semiconductor switch devices connected in parallel to act simultaneously. For example, a plurality of NMOS transistors connected in parallel are controlled to be simultaneously switched on and simultaneously switched off.

It should be noted that, in the foregoing embodiment, the auxiliary power supply 400 provides an operating power supply for the controller 300, the drive module 600, and the isolator 700.

The foregoing embodiment describes a process in which the controller controls the semiconductor switch device to be switched on. In other words, the controller controls the soft-start circuit to work during power-on. The following describes an operating process when the power supply is powered off, in other words, is shut down, with reference to the accompanying drawings.

Embodiment 4 of a power supply system:

Still refer to FIG. 5. The controller 300 is further configured to control the power conversion circuit 500 to be switched off when a voltage of a power supply or the voltage of the bus capacitor is less than a third preset voltage. It may be understood that, when the semiconductor switch device is switched on, the voltage of the power supply is theoretically equal to the voltage of the bus capacitor. Therefore, the voltage of the power supply may be detected and compared with the third preset voltage, or the voltage of the bus capacitor may be detected and compared with the third preset voltage.

The following still uses an example in which an end B is connected to a −48 V voltage and the third preset voltage may be set to 34 V. It should be noted that, when the power supply is powered off, the power conversion circuit needs to be switched off first and then the semiconductor switch device needs to be switched off.

An input voltage of the power supply continues to drop. The controller 300 is further configured to send a second drive signal to the drive module 600 when the voltage of the power supply or the voltage of the bus capacitor is less than a fourth preset voltage. The drive module 600 controls, based on the second drive signal, the semiconductor switch device 100 to be switched off. For example, the fourth preset voltage may be less than the third preset voltage, and may be 32 V.

It may be understood that a first drive signal is opposite to the second drive signal described above. For example, when the first drive signal is in a high level, the second drive signal is in a low level. Alternatively, when the controller 300 does not output a signal, the second drive signal is considered as being output by default. When a signal is output, the high-level signal is output and indicates the first drive signal. This embodiment is described by using an example in which the controller 300 disables output of the first drive signal, in other words, correspondingly outputs the second drive signal. When the drive module 600 does not receive the first drive signal, the drive module 600 quickly pulls down a voltage between gate sources of a MOS transistor, to switch off the MOS transistor.

When the voltage of the power supply or the voltage of the bus capacitor is less than a fifth preset voltage, the auxiliary power supply 400 is powered off. For example, the fifth preset voltage may be 20 V.

It should be noted that power-on and shut-down (power-off) of the auxiliary power supply 400 are automatically implemented, and do not need to be controlled. When the input voltage reaches a specific degree, the auxiliary power supply 400 is powered on. When the input voltage drops to a specific degree, the auxiliary power supply 400 is powered off. After the auxiliary power supply 400 is powered off, a gate-source voltage of the MOS transistor continues to be pulled down. In other words, the MOS transistor remains in a switched-off state.

The power supply system is described in the foregoing embodiments. The following describes a soft-start circuit provided in an embodiment of this application. It may be understood that the power supply system described in the foregoing embodiments already includes the soft-start circuit. Therefore, for a specific operating principle and an implementation form of the soft-start circuit, refer to the embodiments of the power supply system. Details are not described herein again, and only brief description is provided.

Figure 8:
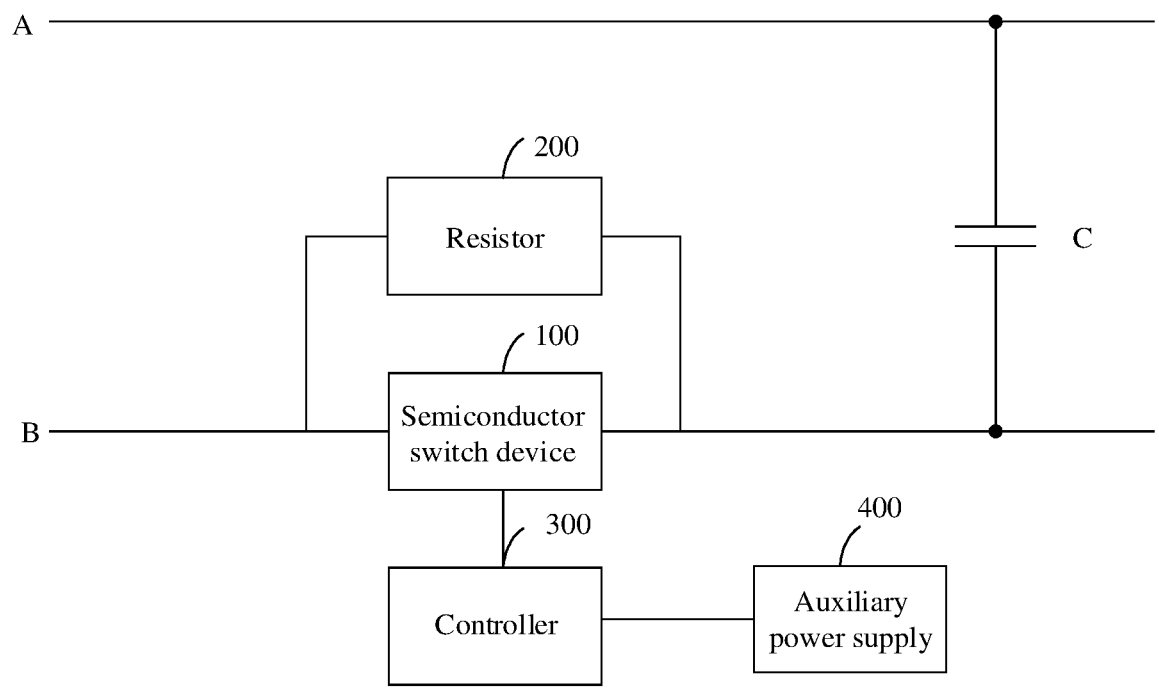
FIG. 8 is a schematic diagram of a soft-start circuit according to an embodiment of this application.

FIG. 8 is a schematic diagram of a soft-start circuit according to an embodiment of this application.

The soft-start circuit provided in this embodiment includes a semiconductor switch device 100, a resistor 200, a controller 300, and an auxiliary power supply 400.

A second end of the semiconductor switch device 100 is connected to a second end of a bus capacitor C, a first end of the semiconductor switch device 100 is connected to a second end of a power supply, and a first end of the bus capacitor C is connected to a first end of the power supply.

Two ends of the resistor 200 are separately connected to the first end and the second end of the semiconductor switch device 100. When the semiconductor switch device 100 is switched off, the power supply supplies power to the bus capacitor by using the resistor 200. When a voltage of the bus capacitor is greater than a first preset voltage, the auxiliary power supply is powered on and the semiconductor switch device is switched off.

The controller 300 is configured to control the semiconductor switch device 100 to be switched on when the voltage of the bus capacitor C is greater than a second preset voltage. The second preset voltage is greater than the first preset voltage. After the semiconductor switch device is switched on, the power supply supplies power to the bus capacitor by using the semiconductor switch device.

The soft-start circuit may further include a drive module. For specific operation, refer to the foregoing embodiments of the power supply system, and the following only gives brief description.

A first end of the drive module is connected to the controller, and a second end of the drive module is connected to a control end of the semiconductor switch device. The auxiliary power supply is configured to supply power to the drive module.

When the voltage of the bus capacitor is greater than the first preset voltage, the auxiliary power supply is powered on and the semiconductor switch device is switched off. The second preset voltage is greater than the first preset voltage.

The controller is specifically configured to send a first drive signal to the drive module when the voltage of the bus capacitor is greater than the second preset voltage.

The drive module is configured to control, based on the first drive signal, the semiconductor switch device to be switched on.

The soft-start circuit may further include an isolator connected between the controller and the drive module. The isolator may be an optical coupler.

The controller is specifically configured to: control the optical coupler to be switched on when the voltage of the bus capacitor is greater than the second preset voltage; otherwise, control the optical coupler to be switched off.

When an input voltage is powered off, in other words, shut down, the controller is further configured to send a second drive signal to the drive module when a voltage of the power supply is less than a fourth preset voltage. The drive module controls, based on the second drive signal, the semiconductor switch device to be switched off. It may be understood that, when the controller actually works, the controller may not send the first drive signal to the drive module, which may be equivalent to sending a second drive signal to the drive module. For example, the first drive signal is in a high level. When the controller stops sending the high-level signal to the drive module, it is equivalent to sending a low-level signal to the drive module.

The soft-start circuit provided in this embodiment of this application may be used in any scenario where soft start is required. This is not specifically limited in this embodiment of this application. For example, the soft-start circuit may be used in a board or a power supply module in a power supply system of a power supply. During hot swapping, the soft-start circuit is required to perform soft start to avoid a transient large current surge. Because a volume of the semiconductor switch device in the soft-start circuit is smaller than that of a relay, a volume of the entire soft-start circuit can be reduced. In addition, the controller of the soft-start circuit may accurately control an on/off state of the semiconductor switch device based on a voltage, so that the semiconductor switch device crosses a linear region as soon as possible and is saturated and switched on, reducing a switch-on loss. Furthermore, if operating time in the linear region is shorter, the semiconductor switch device with a smaller size may be selected, further reducing the size of the entire soft-start circuit.

An example in which an input power is 2200 W is used for description. A soft-start circuit including a relay and a resistor occupies an area of about 3000 square millimeters of a PCB. A soft-start circuit including an uncontrolled MOS and a resistor occupies an area of about 2000 square millimeters of the PCB. A soft-start circuit including a controlled MOS and the resistor provided in this embodiment of this application occupies an area of about 1000 square millimeters of the PCB. Obviously, the area of the soft-start circuit provided in this embodiment is greatly reduced, and the size of the entire circuit is further reduced.

Based on the soft-start circuit provided in the foregoing embodiment, an embodiment of this application further provides a control method. The following gives detailed description with reference to the accompanying drawings.

Figure 9:
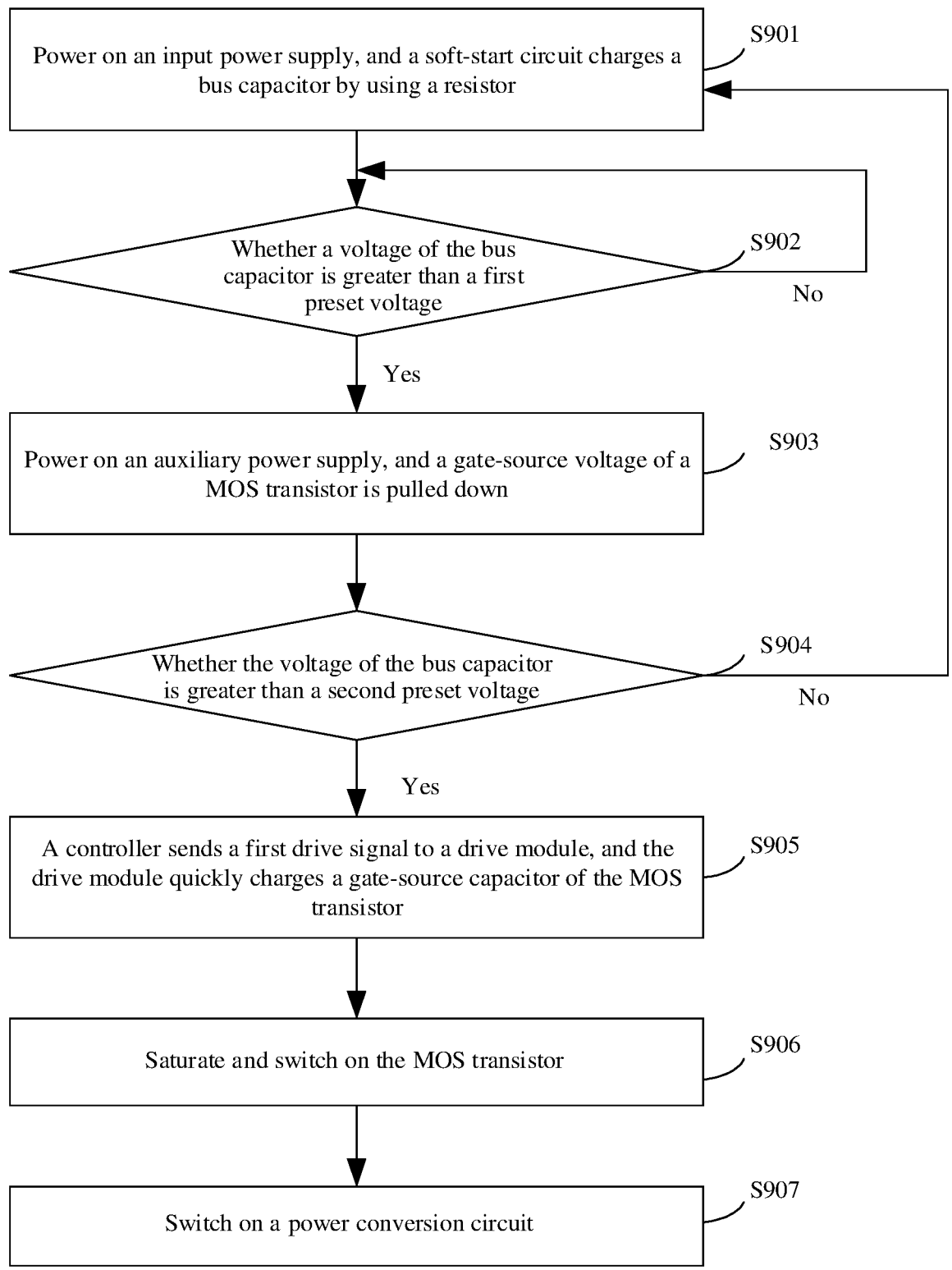
FIG. 9 is a flowchart of a control method of a soft-start circuit according to an embodiment of this application.

Method Embodiment 1:

FIG. 9 is a flowchart of a control method of a soft-start circuit according to an embodiment of this application.

Based on the control method of the soft-start circuit provided in this embodiment, the soft-start circuit includes a semiconductor switch device, a resistor, and a controller. A second end of the semiconductor switch device is connected to a second end of a bus capacitor. A first end of the semiconductor switch device is connected to a second end of a power supply. A first end of the bus capacitor is connected to a first end of the power supply. Two ends of the resistor are separately connected to the first end and the second end of the semiconductor switch device. When the semiconductor switch device is switched off, the power supply supplies power to the bus capacitor by using the resistor.

The method includes:

When a voltage of the bus capacitor is greater than a first preset voltage, powering on an auxiliary power supply and switching off the semiconductor switch device; and controlling the semiconductor switch device to be switched on when the voltage of the bus capacitor is greater than a second preset voltage.

The soft-start circuit further includes a drive module.

The controlling the semiconductor switch device to be switched on when the voltage of the bus capacitor is greater than a second preset voltage specifically includes:

sending a first drive signal to the drive module when the voltage of the bus capacitor is greater than the second preset voltage, so that the drive module controls, based on the first drive signal, the semiconductor switch device to be switched on. The second preset voltage is greater than the first preset voltage. After the semiconductor switch device is switched on, the power supply supplies power to the bus capacitor by using the semiconductor switch device.

The following describes the soft-start control method during power-on of the power supply based on the flowchart.

S901: Power on an input power supply, and the soft-start circuit charges the bus capacitor by using the resistor.

The resistor may be a cement resistor or the like. This is not specifically limited in this embodiment of this application. Because the resistor can implement a current limiting function, the resistor may suppress a large current surge caused when the input power supply is powered on.

S902: Whether the voltage of the bus capacitor is greater than the first preset voltage. If yes, perform S903; otherwise, continue to perform S902. As charging time increases, the voltage of the bus capacitor gradually increases.

S903: Power on the auxiliary power supply, and a gate-source voltage of a MOS transistor is pulled down.

S904: Determine whether the voltage of the bus capacitor is greater than the second preset voltage. If yes, perform S905; otherwise, perform S901. The second preset voltage is greater than the first preset voltage.

S905: The controller sends the first drive signal to the drive module, and the drive module quickly charges a gate-source capacitor of the MOS transistor. That is, the controller controls the MOS transistor to implement fast switch-on, to cross a linear region as soon as possible. This can reduce power consumption, and reduce an SOA performance requirement of the MOS transistor.

S906: Saturate and switch on the MOS transistor.

S907: Switch on a power conversion circuit. After the MOS transistor is switched on, the next-stage power conversion circuit is switched on.

The control method of the soft-start circuit provided in this embodiment can control the soft-start circuit. Because a volume of the semiconductor switch device in the soft-start circuit is smaller than that of a relay, a volume of the entire soft-start circuit can be reduced. The control method of the soft-start circuit can accurately control an on/off state of the semiconductor switch device based on the voltage of the bus capacitor. That is, a switch-on time node of the semiconductor switch device is accurately controlled, so that the semiconductor switch device crosses the linear region as soon as possible and is saturated and switched on. This can reduce a switch-on loss of the semiconductor switch device. In addition, if operating time of the semiconductor switch device in the linear region is shorter, the semiconductor switch device with a smaller size may be selected, further reducing the size of the entire soft-start circuit. The method can accurately control the switch-on time node of the semiconductor switch device in the soft-start circuit. Therefore, a circuit size can be reduced, power consumption can be reduced, and power supply efficiency of the power supply can be improved.

The foregoing describes a control process when the power supply is powered on. The following describes a control process when the power supply is powered off.

Figure 10:
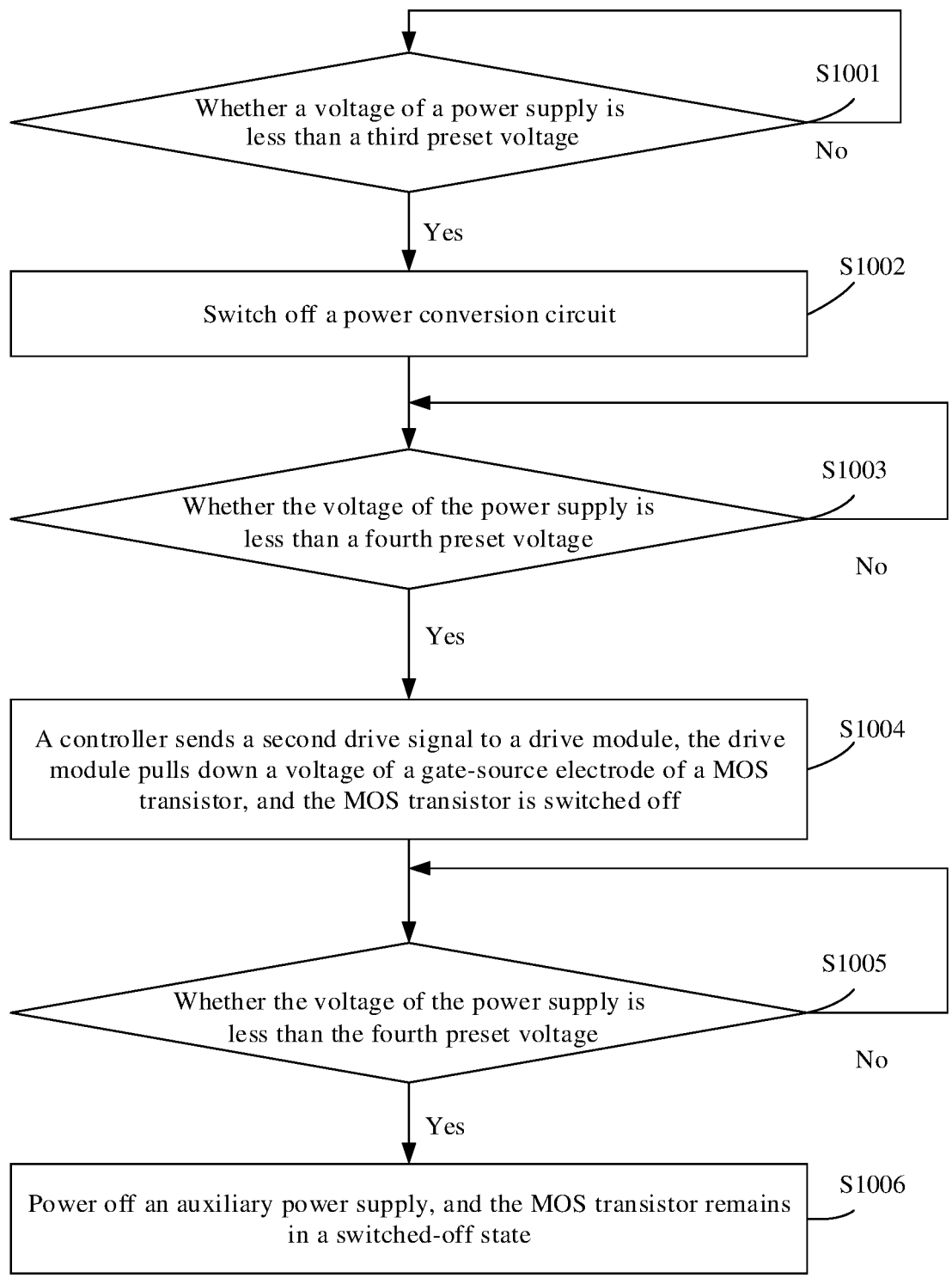
FIG. 10 is a flowchart of a control method of another soft-start circuit according to an embodiment of this application.

Method Embodiment 2:

FIG. 10 is a flowchart of a control method of another soft-start circuit according to an embodiment of this application.

The method further includes:

sending a second drive signal to a drive module when a voltage of a power supply is less than a fourth preset voltage. The drive module controls, based on the second drive signal, a semiconductor switch device to be switched off. The fourth preset voltage is greater than a second preset voltage.

The voltage of the power supply means an input voltage between an end A and an end B.

S1001: Whether the voltage of the power supply or a voltage of a bus capacitor is less than a third preset voltage. If yes, perform S1002; otherwise, perform S1001. When a MOS transistor is switched on, the voltage of the power supply is almost equal to the voltage of the bus capacitor. Therefore, the voltage of the power supply may be compared with the third preset voltage, or the voltage of the bus capacitor may be compared with the third preset voltage. This is not specifically limited in this embodiment of this application.

S1002: Switch off a power conversion circuit.

The power conversion circuit may be controlled by a controller, or may be controlled by another processor, to be switched off.

S1003: Whether the voltage of the power supply or the voltage of the bus capacitor is less than the fourth preset voltage. If yes, perform S1004; otherwise, perform S1003.

S1004: The controller sends the second drive signal to the drive module, the drive module pulls down a voltage of a gate-source electrode of the MOS transistor, and the MOS transistor is switched off.

S1005: Whether the voltage of the power supply or the voltage of the bus capacitor is less than a fifth preset voltage. If yes, perform S1006; otherwise, perform S1005.

S1006: Power off the auxiliary power supply, and the MOS transistor remains in a switched-off state.

Usually, during power-off, the power conversion circuit needs to be switched off first, and then the MOS transistor needs to be switched off. This sequence is opposite to that during power-on.

It should be noted that the control method provided in this embodiment of this application is applicable to both the power supply system described in the foregoing embodiments and the soft-start circuit described in the foregoing embodiment. A value of each preset voltage is not limited in this embodiment of this application. For a possible implementation, refer to description in the foregoing embodiment. Details are not described herein again. In addition, another value relationship and another voltage value may also be selected based on an actual requirement.

It should be understood that in this application, "at least one" means one or more and "a plurality of" means two or more. Therefore, any simple amendment, equivalent variation, and modification made on the foregoing embodiments according to the technical essence of this application without departing from the content of the technical solution of this application shall fall within the protection scope of the technical solution of this application.

What is claimed is:

1. A power supply system, comprising a semiconductor switch device, a resistor, a controller, a bus capacitor, an auxiliary power supply, and a power conversion circuit, wherein the auxiliary power supply is configured to supply power to the controller;
   a first end of the bus capacitor is connected to a first end of a power supply, and a second end of the bus capacitor is connected to a second end of the semiconductor switch device; and a first end of the semiconductor switch device is connected to a second end of the power supply;
   a first input end of the power conversion circuit is connected to the first end of the bus capacitor, and a second input end of the power conversion circuit is connected to the second end of the bus capacitor;
   two ends of the resistor are separately connected to the first end and the second end of the semiconductor switch device; and when the semiconductor switch device is switched off, the power supply supplies power to the bus capacitor by using the resistor;
   when a voltage of the bus capacitor is greater than a first preset voltage, the auxiliary power supply is powered on and the semiconductor switch device is switched off; and
   the controller controls the semiconductor switch device to be switched on when the voltage of the bus capacitor is greater than a second preset voltage, wherein the second preset voltage is greater than the first preset voltage; and after the semiconductor switch device is switched on, the power supply supplies power to the bus capacitor by using the semiconductor switch device.

2. The power supply system according to claim 1, further comprising a drive module, wherein
   a first end of the drive module is connected to the controller, and a second end of the drive module is connected to a control end of the semiconductor switch device; and when the auxiliary power supply is powered on, the auxiliary power supply is configured to supply power to the drive module, so that the drive module drives the semiconductor switch device to be switched off.

3. The power supply system according to claim 2, wherein the controller is specifically configured to send a first drive signal to the drive module when the voltage of the bus capacitor is greater than the second preset voltage; and the drive module is configured to control, based on the first drive signal, the semiconductor switch device to be switched on.

4. The power supply system according to claim 2, further comprising an isolator, wherein
   the isolator is connected between the controller and the drive module.

5. The power supply system according to claim 4, wherein the isolator is an optical coupler; and
   the controller is specifically configured to: control the optical coupler to be switched on when the voltage of the bus capacitor is greater than the second preset voltage; and control the optical coupler to be switched off when the voltage of the bus capacitor is not greater than the second preset voltage.

6. The power supply system according to claim 1, wherein the controller is further configured to control the power conversion circuit to be switched on after the semiconductor switch device is switched on.

7. The power supply system according to claim 2, wherein the controller is further configured to control the power conversion circuit to be switched off when a voltage of the power supply is less than a third preset voltage.

8. The power supply system according to claim 7, wherein the controller is further configured to send a second drive signal to the drive module when the voltage of the power supply or a bus voltage is less than a fourth preset voltage, wherein the drive module controls, based on the second drive signal, the semiconductor switch device to be switched off, and the fourth preset voltage is less than the third preset voltage.

9. The power supply system according to claim 8, wherein when the voltage of the power supply or the bus voltage is less than a fifth preset voltage, the auxiliary power supply is powered off, and the fifth preset voltage is less than the fourth preset voltage.

10. A soft-start circuit, comprising a semiconductor switch device, a resistor, an auxiliary power supply, and a controller, wherein the auxiliary power supply is configured to supply power to the controller;
    a second end of the semiconductor switch device is connected to a second end of a bus capacitor; a first end of the semiconductor switch device is connected to a second end of a power supply; and a first end of the bus capacitor is connected to a first end of the power supply;
    two ends of the resistor are separately connected to the first end and the second end of the semiconductor switch device; and when the semiconductor switch device is switched off, the power supply supplies power to the bus capacitor by using the resistor;
    when a voltage of the bus capacitor is greater than a first preset voltage, the auxiliary power supply is powered on and the semiconductor switch device is switched off; and
    the controller is configured to control the semiconductor switch device to be switched on when the voltage of the bus capacitor is greater than a second preset voltage, wherein the second preset voltage is greater than the first preset voltage; and after the semiconductor switch device is switched on, the power supply supplies power to the bus capacitor by using the semiconductor switch device.

11. The circuit according to claim 10, further comprising a drive module, wherein
    a first end of the drive module is connected to the controller, and a second end of the drive module is connected to a control end of the semiconductor switch device; and when the auxiliary power supply is powered on, the auxiliary power supply is configured to supply power to the drive module, so that the drive module drives the semiconductor switch device to be switched off.

12. The circuit according to claim 11, wherein the controller is specifically configured to send a first drive signal to the drive module when the voltage of the bus capacitor is greater than the second preset voltage; and
the drive module is configured to control, based on the first drive signal, the semiconductor switch device to be switched on.

13. The circuit according to claim 12, further comprising an optical coupler connected between the controller and the drive module, wherein
the controller is specifically configured to: control the optical coupler to be switched on when the voltage of the bus capacitor is greater than the second preset voltage; and control the optical coupler to be switched off when the voltage of the bus capacitor is not greater than the second preset voltage.

14. The circuit according to claim 12, wherein the controller is further configured to send a second drive signal to the drive module when a voltage of the power supply or the voltage of the bus capacitor is less than a fourth preset voltage, wherein the drive module controls, based on the second drive signal, the semiconductor switch device to be switched off.

15. A control method of a soft-start circuit, wherein the soft-start circuit comprises a semiconductor switch device, a resistor, and a controller; a second end of the semiconductor switch device is connected to a second end of a bus capacitor; a first end of the semiconductor switch device is connected to a second end of a power supply; a first end of the bus capacitor is connected to a first end of the power supply; two ends of the resistor are separately connected to the first end and the second end of the semiconductor switch device; when the semiconductor switch device is switched off, the power supply supplies power to the bus capacitor by using the resistor; and
the method comprises:
when a voltage of the bus capacitor is greater than a first preset voltage powering on an auxiliary power supply and switching off the semiconductor switch device; and
controlling the semiconductor switch device to be switched on when the voltage of the bus capacitor is greater than a second preset voltage, wherein the second preset voltage is greater than the first preset voltage; and after the semiconductor switch device is switched on, the power supply supplies power to the bus capacitor by using the semiconductor switch device.

16. The control method according to claim 15, wherein the soft-start circuit further comprises a drive module; and
the controlling the semiconductor switch device to be switched on when the voltage of the bus capacitor is greater than a second preset voltage specifically comprises:
sending a first drive signal to the drive module when the voltage of the bus capacitor is greater than the second preset voltage, so that the drive module controls, based on the first drive signal, the semiconductor switch device to be switched on.

17. The control method according to claim 16, further comprising:
sending a second drive signal to the drive module when a voltage of the power supply or the voltage of the bus capacitor is less than a fourth preset voltage, wherein the drive module controls, based on the second drive signal, the semiconductor switch device to be switched off.

* * * * *